(12) United States Patent
Wright

(10) Patent No.: US 10,278,530 B1
(45) Date of Patent: May 7, 2019

(54) CHILD-SAFE, CUTLERY DEVICE FOR SEPARATELY CORING AND/OR SLICING A STRAWBERRY

(71) Applicant: Peter Wright, Middle River, MD (US)

(72) Inventor: Peter Wright, Middle River, MD (US)

( * ) Notice: Subject to any disclaimer, the term of this patent is extended or adjusted under 35 U.S.C. 154(b) by 0 days.

(21) Appl. No.: 15/995,888

(22) Filed: Jun. 1, 2018

(51) Int. Cl.
  *A47J 25/00* (2006.01)
  *B26D 3/26* (2006.01)
  *B26B 27/00* (2006.01)

(52) U.S. Cl.
  CPC ............... *A47J 25/00* (2013.01); *B26B 27/00* (2013.01); *B26D 3/26* (2013.01)

(58) Field of Classification Search
  CPC .......... A47J 25/00; B26B 27/00; B26B 27/02; B26D 3/26
  See application file for complete search history.

(56) References Cited

U.S. PATENT DOCUMENTS

| | | | |
|---|---|---|---|
| 1,581,310 A * | 4/1926 | Fetschan | B26D 3/24 30/114 |
| 3,865,317 A * | 2/1975 | Brehm | A47J 19/04 241/169.2 |
| 4,949,459 A | 8/1990 | Noble | |
| 5,092,043 A | 3/1992 | Shirkey | |
| 5,794,344 A | 8/1998 | Poulos et al. | |
| 6,550,366 B2 | 4/2003 | Ortega et al. | |
| 7,266,894 B1 * | 9/2007 | Hinckley | B26D 1/0006 30/302 |
| D586,628 S * | 2/2009 | Bevers | D7/672 |
| 7,779,739 B2 | 8/2010 | Peterson et al. | |
| 8,234,975 B2 | 8/2012 | Holcomb et al. | |
| 9,193,081 B2 | 11/2015 | Wright | |
| 2004/0117989 A1 * | 6/2004 | Horng | B26D 3/26 30/114 |

OTHER PUBLICATIONS https://www.bedbathandbeyond.com/store/product/fusionbrands-pushberry-strawberry-tool/1062630115?skuld=62630115&mrkgcl=609&mrkgadid=3248311831&rkg_id=h-c283121bad7de5d67c99d7817ba8ff97_t-1526420096&utm_source=shopzilla&utm_medium=cse&zmam=77312802&zmac=5&zmas=1&zmap=62630115&mcid=CSE_shopzilla_paid_none_&feedonomics_pid=62630115&feedonomics_mid=F609&feedonomics_channel=shopzilla. Website showing product printed May 17, 2018.

* cited by examiner

*Primary Examiner* — Stephen Choi
(74) *Attorney, Agent, or Firm* — Larry J. Guffey, Esq.; Pamela K. Riewerts, Esq.; Oliver & Grimsley, LLC

(57) ABSTRACT

A child-safe, cutlery device that separately cores and slices a strawberry includes: a ring having an inner perimeter surface that encloses a central void and an outer perimeter surface, an elongated cutting member having a first end and a second end that are each attached to opposing points on the ring's inner perimeter surface, a top surface with a pointed edge that is adapted to be a cutting edge, a pair of elongated handle members, each of which has a proximal and a distal end and wherein each of the handle members' proximal ends is attached to the ring's outer perimeter surface at one of a pair of spaced-apart, attachment points.

12 Claims, 4 Drawing Sheets

CHILD-SAFE, CUTLERY DEVICE FOR SEPARATELY CORING AND/OR SLICING A STRAWBERRY

BACKGROUND OF THE INVENTION

1. Field of the Invention

The present invention relates generally to cutlery and food cutting devices, and, more particularly to a hand cutlery device that can core and/or slice a strawberry in an especially safe manner.

2. Description of the Related Art

Many fruits come to retail consumers in a form that requires some additional, minimal preparation, other than cooking, before they are totally ready to be eaten. For example, strawberries usually are found in grocery stores in one- or two-pint baskets in which there are some leaves and part of the stem still attached to the top of the strawberries.

Additionally, strawberries, like many other fruits, have a core that is less edible, at least from a taste perspective, than the rest of the berry. Such cores are typically removed (i.e., the strawberry is cored) when one wishes to present strawberries in a form that the majority of people would probably find most appetizing. The cavity that remains in the top of the strawberry, after it has been cored, can also be filled with various flavored toppings to enhance the edibility of such core-filled strawberries.

Slicing or partitioning (e.g., into four, approximately-equal volume pieces or segments) of de-stemmed and cored strawberries from their top to their bottom can also release the juices of the berries and further add to their appeal; as, for example, in a bowl of sliced strawberries.

A paring knife is probably the most commonly employed cutlery item used to remove the stem and core from a strawberry and to slice it. This method generally works well, but it has disadvantages. For example, it is time consuming and the sharp edge of the paring knife can present a safety hazard to its user.

Several specialized, hand-operated or hand devices have been disclosed for separating the outer meat of the strawberry from its stem and core. For example, U.S. Pat. No. 4,949,459 discloses a device including a solid tubular member that extends from one end of a tubular handle. The tubular member is directed through the center of the strawberry until the stem and core are detached from the strawberry. Then the stem and core are pulled out of the tube. Successful operation of the invention depends on the stem not being separated from the core until after the stem has been pulled out of the tube.

U.S. Pat. No. 5,092,043 discloses a strawberry stem/core remover that includes a hollow tubular member that extends from one end of an approximately tubular handle. The strawberry is pushed down over the free end of the hollow tube which cuts through the strawberry and separates the core from the outer meat of the berry. The core being removed from a subsequent strawberry forces the core from a preceding berry through the tube toward an exit end of the core so that, when a sufficient number of berries have been cored, the cores from subsequent berries are forced out of the exit of the core.

Neither of these specialized, hand-held devices can be used to slice a strawberry, so a paring or other knife would still have to be used for this task.

See also the website "https://www.fusionbrands.com/collections/food-prep/products/pushberry" where there is disclosed a cutlery device that can simultaneously core and slice by coring out a constant diameter hole from the top to the bottom of the strawberry. However, this can be problematic if the strawberry has leaves on its top that extend out beyond what would typically be the diameter of the core-out hole at the top of the strawberry. See FIG. 3A. In this situation, a paring knife would likely have to be used to remove these leaves before simultaneously coring and slicing the strawberry. Consequently, this device is actually seen to teach away from the present invention that has been designed to separately core and/or slice while not requiring the separate use of any paring knife.

U.S. Pat. No. 9,193,081, which was issued to the present inventor, discloses a child-safe, hand-held device that can also separately core and slice various types of fruits, including strawberries. It includes a tubular handle and a wire member that extends from one end of the handle. The wire member is bent into a configuration that is adapted to: (a) provide the outline of: (i) a triangular-shaped structure that has three corners and a base that is situated approximately perpendicular to the handle's centerline, and (ii) a wing-like structure that extends perpendicular to the handle's centerline from each of the corners of the base of the structure, (b) enable the triangular-shaped structure to penetrate a fruit that is to be cored and sliced, and by the at least 180 degree rotation of the handle to core out a core section of the fruit, and (c) enable this wing-like structure to penetrate and slice the fruit into two halves when the handle is moved forward along the handle's centerline.

Despite the usefulness of the hand-held device of U.S. Pat. No. 9,193,081 for either coring or slicing strawberries, it has encountered some problems with its widespread introduction into the marketplace. For example, because of its comparatively complex design, it is somewhat costly to both manufacture and ship.

Thus, further improvements are needed in the cutlery devices now available for separately either coring and/or slicing strawberries.

SUMMARY OF THE INVENTION

Recognizing the need for the development of a less expensive to manufacture, package and ship, cutlery device for separately coring and slicing fruit, the present invention is generally directed to satisfying the needs set forth above and overcoming the problems and disadvantages exhibited by prior fruit corers and slicers.

In accordance with a preferred embodiment of the present invention, a child-safe, cutlery device that separately cores and slices a strawberry includes: (a) a ring having an inner perimeter surface that encloses a central void and an outer perimeter surface, (b) an elongated cutting member having a first end and a second end, and a top and a bottom surface, (c) wherein each of these ends is attached to opposing points on the ring's inner perimeter surface, (d) wherein the cutting member's top surface has a pointed edge that is configured so that it is usable as cutting edge, (e) a pair of elongated coring or handle members, each of which has a proximal and a distal end and a junction point between these ends, and a centerline that extends between these ends, and (f) wherein each of the coring or handle members' proximal ends is attached to the ring's outer perimeter surface at one of a pair of spaced-apart, attachment points.

A preferred embodiment is further characterized by each of the pair of handle members having a configuration proximate the handle member's proximal that is adapted to bring the handle members together so that their junction points contact each other.

A preferred embodiment is additionally characterized by each of the pair of handle members having a configuration between its junction point and distal end that is adapted to first increase the separation distance the handle members and then decrease this distance in the vicinity of the distal ends so that they contact each other to form a contact region proximate the handle member's distal ends.

A preferred embodiment is still further characterized by the contact region having a notch that has a configuration adapted to aid this contact region in penetrating the outer surface of a strawberry and cutting through the strawberry's interior portion.

A preferred embodiment is yet further characterized by the geometry of the ring being characterized, in part, by a flat plane, and wherein each of the elongated handle members is attached to the ring in such a manner that these elongated handle members are proximate the ring's flat plane.

A preferred embodiment is also characterized by the combination of the ring and elongated cutting member having a configuration adapted to provide this combination with structural rigidity that enables the top surface's pointed edge to slice a strawberry when its top end is placed directly above the pointed edge and one presses the strawberry's bottom end down into and over the pointed edge and through the ring.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 1:
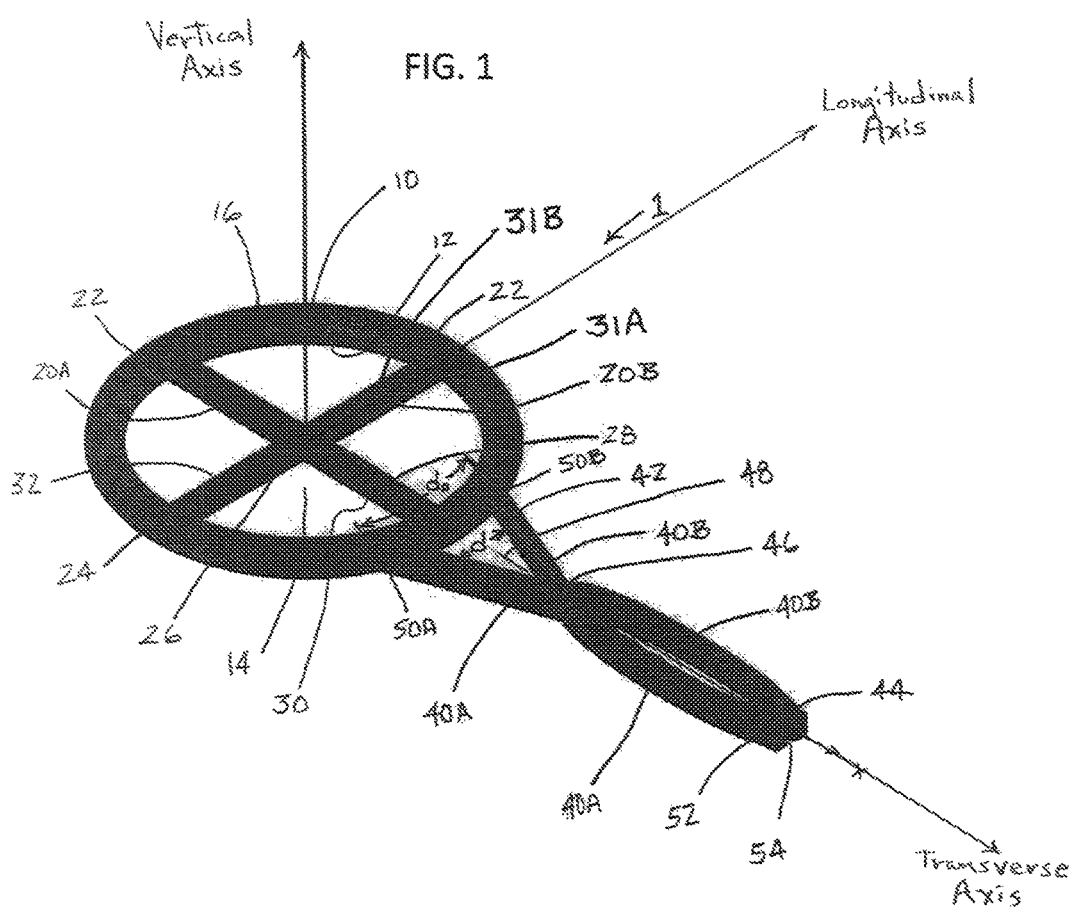
FIG. 1 is a perspective view of a preferred embodiment of the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Referring to FIG. 1, there is illustrated a preferred embodiment of the present invention 1 which is illustrated in a perspective view. In this embodiment, the present invention takes the form of a child-safe, cutlery device that can separately and independently core and slice strawberries. It includes a ring 10 or inner-tube-like structure that is formed by shaping a length of a uniform-cross-sectional-area tubular material into a circle and so that the trajectory of the center point of this uniform-cross-sectional-area lies in a flat plane and then joining the ends of the tubular material so that the resulting ring or flat, planar ring has a uniform-cross-sectional-area around the circumference of the ring and an inner perimeter surface 12 that encloses a central void 14 and an outer perimeter surface 16. The geometry of this flat, planar ring can also be said to have or be characterized by the ring's flat plane that is determined by all those points that lie inside or outside the flat, planar, boundary surface consisting of the center points of the cross-sectional areas of the ring as one passes through the cross sections in moving around the circumference of the ring. Consequently, we say that the geometry of this ring is characterized, in part, by having a flat plane.

The reason for being so precise in defining this geometrical aspect of the ring is that the "flat plane" feature will be useful in later describing how a corer or handle-like or handle attaches to this ring.

Situated in the ring's central void is a pair of elongated cutting members 20A, 20B. Each of these has a first 22 and a second 24 end and a longitudinal axis that extends between these ends. Each cutting member also has a midpoint 26 between their ends, and with this midpoint also seen to be the center point of the ring. Each cutting member further has a top 28 and a bottom 30 surface between which extends a vertical axis. Each cutting member additionally has a right 31A and a left 31B side between which extends a transverse axis that extends between these sides. Note also that these longitudinal, vertical and transverse axes form a Cartesian coordinate system whose origin is located at the ring's center point and that this Cartesian coordinate system can be useful in describing the geometry of the present invention. See FIG. 1.

An elongated corer or handle is provided for the device by utilizing a pair of elongated coring or handle members 40A and 40B. Each coring or handle member has a proximal 42 and a distal 44 end and a junction point 46 between these ends, and the pair have a centerline 48 that extends between the ends and along which the length of each coring or handle member is measured.

Figure 4:
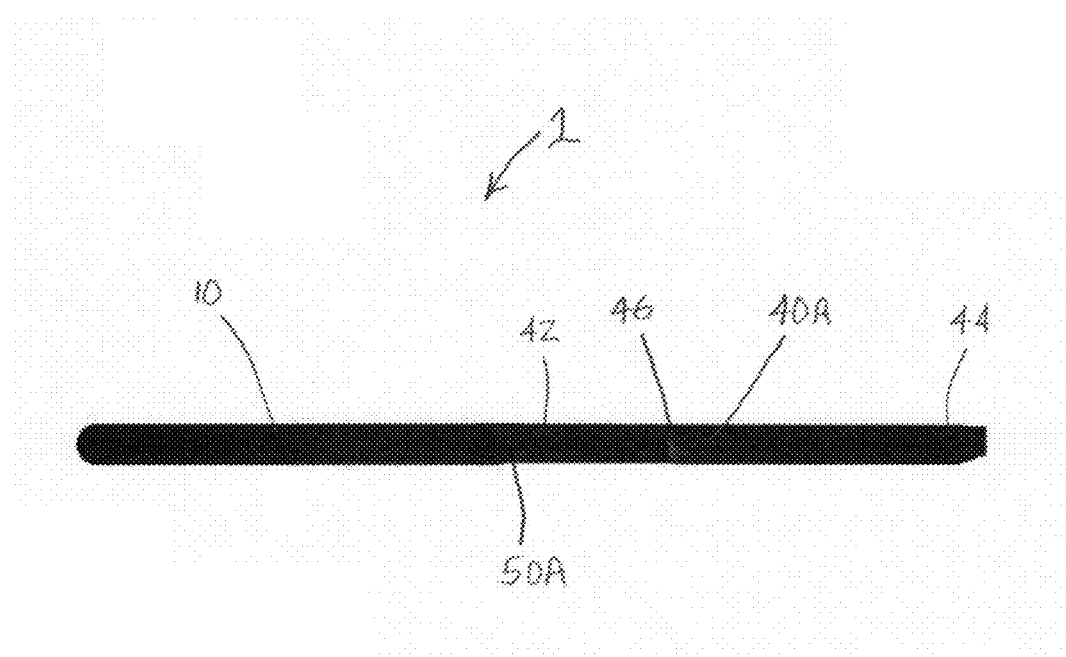
FIG. 4 is a side view of the cutlery device shown in FIG. 1

Each proximal end 42 of the pair of handle members is attached to the outer perimeter surface of the ring at one of a pair of attachment points 50A, 50B. These attachment points are spaced apart and define an initial separation distance, $d_0$, between the pair of attachment points that is initially measured along the outer perimeter surface of the ring. For ease of manufacturing, packaging and shipping, the pair of coring or handle members extend from the ring so that they lie in or proximate the previously described flat plane of the ring (i.e., defined as that flat plane which contains the center points of the ring's cross sections that one would pass through in traveling around the circumference of the ring). This configuration results in the device having a side view that shows that the top and bottom surfaces of the device can be represented by parallel, flat lines, see FIG. 4.

Each of the pair of coring or handle members has a configuration proximate its proximal end that is adapted to bring the pair of coring or handle members together so that the separation, d, between them continually decreases until their junction points 46 contact each other. The purpose of this configuration is to provide the cored-out portion of the strawberry that is proximate its top end with a preferred shape, i.e., that of an inverted cone where the apex of the cone lies at a certain depth below the top of the strawberry. This configuration is often preferred when the strawberries are not to be sliced but only served with some type of filling placed in the cored-out portion of the strawberry. Additionally, another benefit of two elongated coring members serving to form a handle rather than a solid-surface handle is that the each of the elongated coring members serves as an individual cutting edge or surface when the distal end of the corer or handle is inserted into the top end and through a strawberry and then rotated around its centerline to core a strawberry and this pair of elongated coring members provides less resistance to rotating the corer or handle than would a solid-surface corer or handle.

Each of this pair of handle members has a configuration between its junction point 46 and its distal end 44 that is adapted to first continuously increase the separation distance, d, been the pair of handle members and then continuously decrease this separation distance in the vicinity of each of the distal ends of the pair of handle members so that the distal ends eventually contact each other to form a contact region 52 proximate the distal ends. This configuration is again preferred so as to yield the desired shaped of the cored-out region of the strawberry that exists below its top-of-the-strawberry, initial inverted cone region and the bottom of the strawberry. Again, another advantage of the two elongated handle members versus a single, solid-surface handle is the less resistance that they provide when rotating the handle to core a strawberry.

Figure 2:
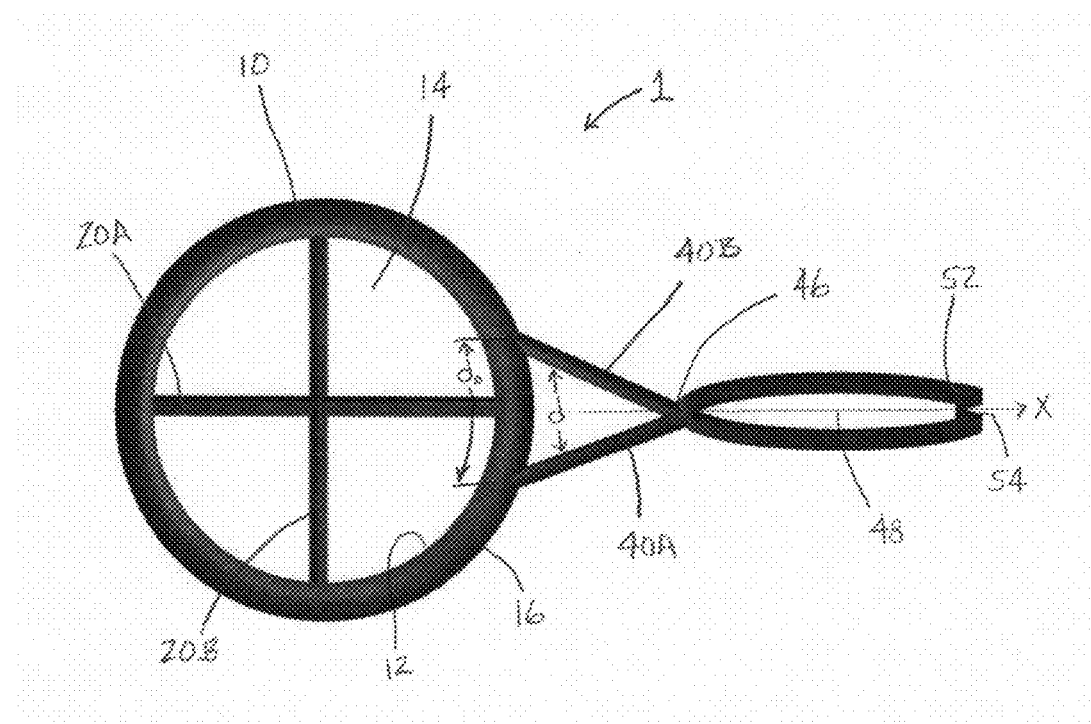
FIG. 2 is a top view of the cutlery device shown in FIG. 1

To aid said contact region to penetrate the outer surface of a strawberry and cut through the interior portion of a strawberry, it is provided with a notch 54 that serves as an additional cutting edge. See FIG. 2.

While the above described configurations for the proximal and distal portions of the handle are generally preferred configurations, it is recognized that they can obviously be easily changed so that such modified configuration would also come within the scope of the disclosure of this invention. Consequently, the cored-out hole that extends from the top to the bottom of the strawberry, as a result of using the present invention, can have a broad range of cross-sectional diameters that vary as one travels along the handle's centerline from its proximal to its distal end, i.e., d(x). the greatest at the top of the strawberry because the difference between the handle's outer edges are the greatest near the handle's proximal end.

Figure 3A:
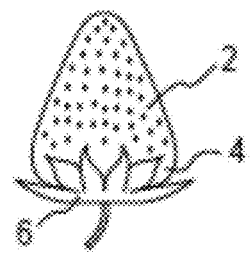
FIGS. 3A-3C show a strawberry at the various stages when it is being cored and sliced, with 3A showing an original strawberry, 3B showing a cored strawberry and 3C showing the end product, for this embodiment, of a strawberry that has been cored and sliced into four equal volumes.
Figure 3B:
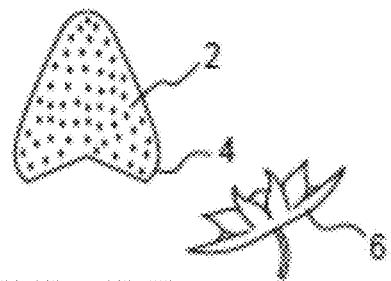
Figure 3C:
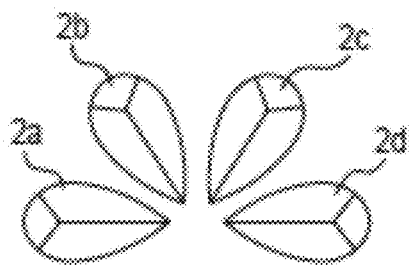

The present invention performs its slicing task by holding the ring's outer perimeter steady and in a position so that there is free space below the ring and then position and above the joined together midpoint 26 of the elongated cutting members 20A, 20B. In this orientation, the pointed edge 32 of the top surface 28 of each of the elongated cutting members is directed upward at the top of the cored-out strawberry. One then, using whatever means one chooses (e.g., the palm of the hand that is not holding the ring), presses the bottom end of said strawberry down into and over the pointed edges 32 and through the void area of the ring so as to spit or slice the strawberry into a number of pieces (since, in the embodiment described above, we have two elongated cutting members, they serve to slice the strawberry into four pieces or sections). See FIGS. 3A-3C where there is seen in FIG. 3A a strawberry and in FIG. 3B a cored strawberry 2 whose top portion 4 shows the outline of the previously mentioned inverted cone that results after removing the core whose top portion in this instance included some leaves 6. FIG. 3C shows a representation of the four segments 2a-2d that result from slicing the strawberry with the embodiment shown in FIGS. 1 and 2.

For those who have a countertop available on which to perform the strawberry slicing task, it can be used to hold upside down a cored strawberry so that its bottom end is directed upward. The pointed edge 32 of the top surface 28 of each of the elongated cutting members is centered above the strawberry and then directed downward at the bottom of the cored-out strawberry. This method of slicing has the advantage that one then can use both hands to hold the perimeter surface of the ring to press it downward so that its pointed edges 32 pass into and through the strawberry so as to spit or slice the strawberry into a number of pieces. Note also that these two slicing methods are similar since the relative motion between the strawberry and the ring is such that in both methods the strawberry effectively passes over the cutting member's pointed edge and through the ring.

The dual purpose (i.e., coring & slicing) and comparatively simple design of the present invention makes it unique and also makes it less costly to manufacture, package and ship that other assortments of culinary devices that might accomplish the same strawberry coring and slicing tasks as the present invention. Various injection molded, plastic prototypes of the present invention have been created and tested for dimensions in the following ranges: diameter of the ring=40-75 mm, length of the handle=60-80 mm, and when the ring has a round cross-sectional shape, the diameter of such a ring cross-sectional section=4-10 mm and this is also seen to be the height range of the side view of the embodiment shown in FIG. 4. Since "feel" is sometimes a consideration when selecting a hand-tool and not everyone likes the "feel" of a plastic hand-tool, the present invention can also be produced in stainless steel for those who want to feel of having a more robust device in their hands.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereinafter set forth in the claims to the invention.

I claim:

1. A child-safe, cutlery device that separately cores and slices a strawberry, said device comprising:
   a ring having a center point and an inner perimeter surface that encloses a central void and an outer perimeter surface,
   an elongated cutting member having a first end and a second end and a longitudinal axis that extends between said first and second ends, and a top and a bottom surface and a vertical axis that extends between said top and bottom surfaces, and a right side and a left side and a transverse axis that extends between said right and left sides, and wherein said longitudinal, vertical and transverse axes form a Cartesian coordinate system whose origin is located at said ring center point,
   wherein said first and second ends of said elongated cutting member are each attached to opposing points on said inner perimeter surface of said ring,
   wherein said top surface of said elongated cutting member has a pointed edge that has a configuration adapted to be a cutting edge,
   a pair of elongated coring members, each coring member having a proximal and a distal end and a junction point between said ends, and a centerline that extends between said ends of said pair of elongated coring members, and wherein each proximal end of said pair of coring members is attached to said outer perimeter surface of said ring at one of a pair of spaced-apart, attachment points on said outer perimeter surface of said ring, wherein the geometry of said ring being characterized in part by said ring inner and outer perimeter surfaces being proximate a flat plane that is defined by the entirety of said longitudinal and transverse axes, and wherein each of said pair of elongated coring members is attached to said ring in such a manner that each of said pair of elongated coring members is proximate said flat plane.

2. The child-safe, cutlery device as recited in claim 1, wherein:

each of said pair of coring members has a configuration proximate the proximal end of said coring member that is adapted to bring said pair of coring members together so that said junction points of said pair of coring members contact each other.

3. The child-safe, cutlery device as recited in claim 2, wherein:

each of said pair of coring members has a configuration between said junction point and said distal end of said coring member that is adapted to, in the vicinity of a separation point, increase the separation distance between said pair of coring members and then decrease said separation distance in the vicinity of each of the distal ends of said pair of coring members so that said distal ends of said pair of coring members contact each other so as to form a contact region proximate said distal ends of said pair of coring members.

4. The child-safe, cutlery device as recited in claim 2, wherein:

the combination of said ring and said elongated cutting member having a configuration adapted to provide said combination with structural rigidity that allows said pointed edge of said top surface of said elongated cutting member to slice a strawberry when the relative motion between said strawberry and said ring is such that said strawberry effectively passes over said pointed edge and through said ring.

5. The child-safe, cutlery device as recited in claim 3, wherein:

said contact region having a notch that has a configuration adapted to aid said contact region to penetrate the outer surface of a strawberry and cut through the interior portion of said strawberry.

6. The child-safe, cutlery device as recited in claim 3, wherein:

the combination of said ring and said elongated cutting member having a configuration adapted to provide said combination with structural rigidity that allows said pointed edge of said top surface of said elongated cutting member to slice a strawberry when the relative motion between said strawberry and said ring is such that said strawberry effectively passes over said pointed edge and through said ring.

7. The child-safe, cutlery device as recited in claim 5, wherein:

the combination of said ring and said elongated cutting member having a configuration adapted to provide said combination with structural rigidity that allows said pointed edge of said top surface of said elongated cutting member to slice a strawberry when the relative motion between said strawberry and said ring is such that said strawberry effectively passes over said pointed edge and through said ring.

8. The child-safe, cutlery device as recited in claim 1, wherein:

each of said pair of coring members has a configuration between said junction point and said distal end of said coring member that is adapted to, in the vicinity of a separation point, increase the separation distance between said pair of coring members and then decrease said separation distance in the vicinity of each of the distal ends of said pair of coring members so that said distal ends of said pair of coring members contact each other so as to form a contact region proximate said distal ends of said pair of coring members.

9. The child-safe, cutlery device as recited in claim 8, wherein:

said contact region having a notch that has a configuration adapted to aid said contact region to penetrate the outer surface of a strawberry and cut through the interior portion of said strawberry.

10. The child-safe, cutlery device as recited in claim 8, wherein:

the combination of said ring and said elongated cutting member having a configuration adapted to provide said combination with structural rigidity that allows said pointed edge of said top surface of said elongated cutting member to slice a strawberry when the relative motion between said strawberry and said ring is such that said strawberry effectively passes over said pointed edge and through said ring.

11. The child-safe, cutlery device as recited in claim 9, wherein:

the combination of said ring and said elongated cutting member having a configuration adapted to provide said combination with structural rigidity that allows said pointed edge of said top surface of said elongated cutting member to slice a strawberry when the relative motion between said strawberry and said ring is such that said strawberry effectively passes over said pointed edge and through said ring.

12. The child-safe, cutlery device as recited in claim 1, wherein:

the combination of said ring and said elongated cutting member having a configuration adapted to provide said combination with structural rigidity that allows said pointed edge of said top surface of said elongated cutting member to slice a strawberry when the relative motion between said strawberry and said ring is such that said strawberry effectively passes over said pointed edge and through said ring.

* * * * *